Aug. 23, 1938.   R. H. STONE   2,127,943
METHOD OF MAKING CORRUGATED FLEXIBLE TUBES
Filed Jan. 30, 1934
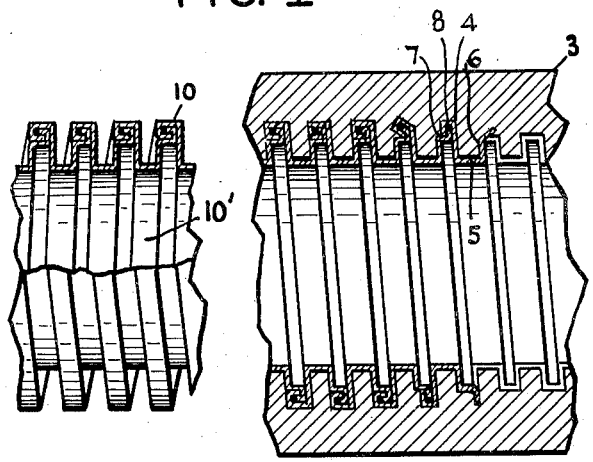
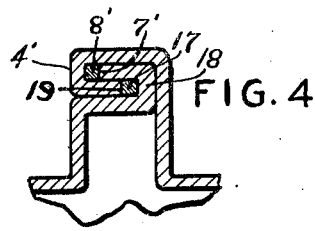
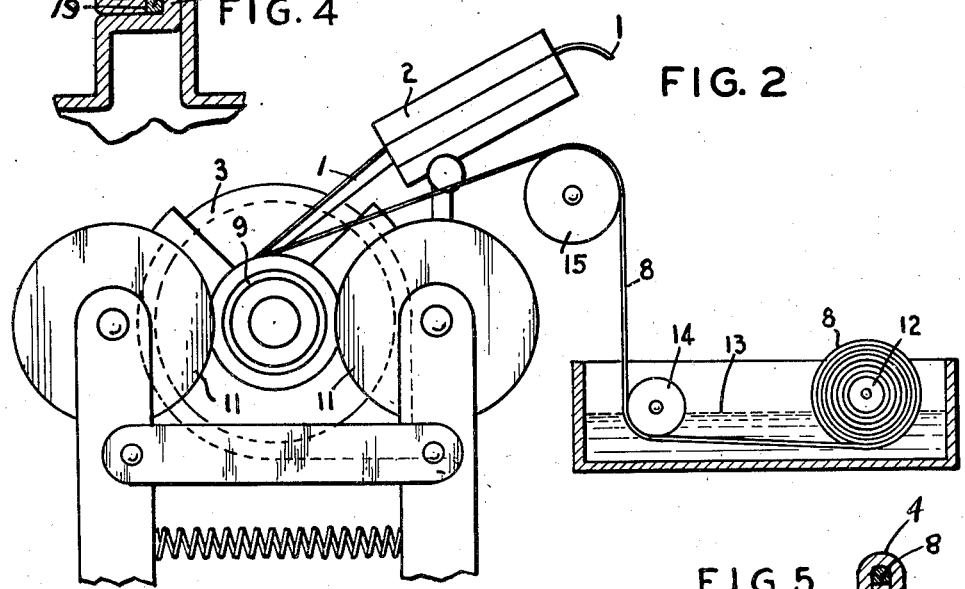
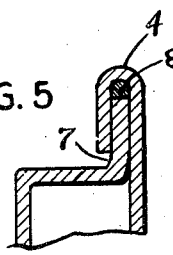
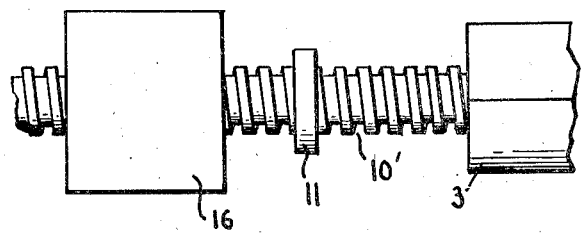
INVENTOR
R. Harry Stone
BY
Thomas Howe
ATTORNEY Patented Aug. 23, 1938

2,127,943

UNITED STATES PATENT OFFICE 2,127,943

METHOD OF MAKING CORRUGATED FLEXIBLE TUBES

R. Harry Stone, Bound Brook, N. J., assignor to Titeflex Metal Hose Co., a corporation of New Jersey Application January 30, 1934, Serial No. 708,951

3 Claims. (Cl. 113—35)

This invention relates to the method of making flexible tubes formed from a helically disposed strip having the edges of adjacent convolutions folded together and wherein the flexibility is provided by a corrugation, the seam being fixed.

In such tubes it is essential that the seam parts remain firm and fixed. Tubes of this character are extremely vulnerable to a twisting action which is liable to cause relative sliding of the seam parts. Such movement having started, the seam rapidly loses its fluid tightness and firmness under repeated flexings and the tube is liable to soon become useless.

Also, in tubes of the character described, the strip from which the tube is formed may not have uniform edges because of having them collide with other objects in the manufacture of the strip, or for other reasons.

It is the main object of the invention to provide a tube of the character described wherein the disadvantages above referred to are avoided, the seam remaining firm and its parts fixed under all circumstances.

The object of the invention may be more specifically stated as an improved method of incorporation into the interior of the seam, of solder whereby the seam is solidified and the seam parts secured together against any possibility of relatively moving them.

A further object of the invention is the improved method of application of the soldering flux to the solder within the seam.

Other and ancillary objects of the invention will appear hereinafter.

In the accompanying drawing which illustrates the invention—

Fig. 1 is a sectional view, partly broken away, showing a tube and a portion of a machine by which the practice of the invention is illustrated;

Fig. 2 is an end elevation of a tube in process of formation from a strip, showing a partial end view of a machine for accomplishing such formation with means for applying the solder and flux to the seam thereof, this view being on a smaller scale than Fig. 1;

Fig. 3 is a side elevation of the apparatus for forming the tube with heating means for treating the tube after formation, the tube passing directly from the forming means to the heater.

Fig. 4 is a fragmentary section, on an enlarged scale, of a modified form of tube seam; and Fig. 5 is a fragmentary section showing, on an enlarged scale, the section of tube seam as it appears in Fig. 1 after adjacent edges of the convolutions are in engagement with the solder thread in position, but before the engaged edges have been folded down as in the completed tube shown in Fig. 1.

Referring to the drawing, and first to Figs. 1, 2 and 5, the tubing may be formed from a metal strip of brass, steel or other suitable metal, by utilizing the method and apparatus as shown and described in the Patent No. 1,198,392 to Louis H. Brinkman, patented September 12, 1916, except that some of the clearances may be required to be slightly modified to accommodate the solder in the seam.

The metal strip 1 of which the tube is formed is passed through the preliminary former 2 whence it passes to the forming die 3.

As this metal strip is fed into the forming die it is of a cross section including the curled-over portion 4, the central longitudinal groove 5 and the right hand portion 6 (Fig. 1). As the strip progresses about the die the portion 6 will, after one revolution, be bent into the right angled section as shown at 7. A portion of this right angled section is embraced by the curled-over portion 4 of the succeeding convolution which is being fed into the die, and as this curled-over portion is fed in, there is fed in with it a thread of solder 8 which may be of any suitable composition, an alloy of 60 parts tin to 40 parts lead having been found satisfactory. This thread of solder will enter in between the outer edge of the right-angled section 7 and the bight of the curled-over portion 4 (see Fig. 5).

As the mandrel 9 revolves and draws the metal strip of which the tube is formed into the forming die, the thread or ribbon of solder 8, being gripped between the portions of the metal strip as described, will be drawn in with the strip and enveloped in the seam as it is formed, and the solder will extend continuously throughout the seam of the tube. From the point where the thread of solder enters the forming die as described, the engaging portions of the adjacent convolutions of the metal strip will be carried forward, as the machine operates, through the various channels of the die until, as the tube 10' leaves the die, it will have a seam as shown in cross section at 10. The thread will remain in the seam between the parts thereof as above indicated and the seam will be rolled down as fully described in the Brinkman patent above referred to by rollers 11 pressed against the seam.

The details of the machine and of the formation of the tube need not be gone into further here as they are described in great detail in the patent above referred to. Enough has been disclosed herein to enable those skilled in the art to suitably incorporate the thread of solder in the seam.

The solder thread 8 is drawn from a reel 12 located in a bath 13 of suitable soldering flux which may satisfactorily be one of the well known resin solutions. From the reel 12 the thread of solder passes over the guide pulleys 14 and 15 and thence into the seam as already described, carrying with it the flux which operates to improve the soldering action within the seam in a manner as is well understood in connection with soldering operations in general. The cross section of the thread of solder is such as to substantially fill the clearance in the seam in which it is introduced as above described.

The tube having been formed with the thread of solder incorporated in its seam as described, is then placed in an oven or otherwise subjected to a high enough temperature to fuse the solder in the seam. The tube is then allowed to cool when the solder will solidify and securely adhere to the parts of the seam holding them in fixed relation and filling in the clearances in the seam whereby it is rendered firm and secure.

The number of operations may be reduced and the manufacture of the tube simplified by passing the formed tube as it emerges from the forming machine, directly through a heater for fusing the solder so that upon cooling of the tube after emergence from the heater it is complete. Thus, referring to Fig. 3, the tube coming from the forming machine comprising the forming die and rolls 11, passes directly into a suitable heater 16, such as gas or electric, where the solder is fused, and upon emerging from the heater the tube cools and the solder hardens with results as above referred to, the process, including the fusing and hardening of the solder, being a continuous one.

In some instances the completed tube might have a cross section of seam as shown in Fig. 5 instead of having the engaging edges bent down into the position as shown at 10 in Fig. 1.

A form of seam, desirable under some circumstances, is shown in cross section in Fig. 4. This seam is similar to that shown at 10 in Fig. 1 except that instead of having one thread of solder between the edge of one convolution and the bight of the curled-over portion of an adjacent convolution, the seam of Fig. 4 has two solder threads 8' and 17, one (8') between the edge 7' of one convolution and the bight of the curled-over portion 4 of the adjacent convolution, and the other (17) between the bight of the curled-over portion 18 of the first mentioned convolution and the edge 19 of the other convolution. If desired one of the threads 8' or 17 might be omitted.

While the invention has been illustrated in what are considered its best applications, the details of the process and also the structure of the tube may be varied without departing from the spirit of the invention which is not therefore limited to the precise details of the method recited nor to the structure of tube as shown in the drawing.

What I claim is:

1. The method of forming a flexible, corrugated tube comprising a helically disposed strip having a longitudinal groove and the edges of adjacent convolutions interfolded to form a helical seam, the said seam being fixed and the tube depending for its flexibility on the bending of the material in the corrugation which consists in helically disposing a strip having a longitudinal groove and interfolding the edges of adjacent convolutions to form the helical seam and introducing into the interior of the seam as it is formed a thread of solder, the solder being passed through a flux bath whereby the flux is carried by the solder into the seam.

2. The method of forming a flexible, corrugated tube comprising a helically disposed strip having a longitudinal groove and the edges of adjacent convolutions interfolded to form a helical seam, the said seam being fixed and the tube depending for its flexibility on the bending of the material in the corrugation which consists in helically disposing a strip having a longitudinal groove and interfolding the edges of adjacent convolutions to form the helical seam and introducing into the interior of the seam as it is formed a thread of solder, a flux being applied to the solder prior to its entrance into the seam whereby the flux is carried into the seam by the solder.

3. The method of forming a flexible, corrugated tube comprising a helically disposed strip having a longitudinal groove and the edges of adjacent convolutions interfolded to form a helical seam, the said seam being fixed and the tube depending for its flexibility on the bending of the material in the corrugation which consists in helically disposing a strip having a longitudinal groove and interfolding the edges of adjacent convolutions to form the helical seam and introducing into the interior of the seam as it is formed a thread of solder, a flux being applied to the solder prior to its entrance into the seam whereby the flux is carried into the seam by the solder, subjecting the formed tube with the solder and flux incorporated in the seam, to a temperature fusing the solder and subsequently permitting the tube to cool and the solder to harden.

R. HARRY STONE.